United States Patent [19]

Sleger et al.

[11] Patent Number: 4,682,255
[45] Date of Patent: Jul. 21, 1987

[54] ACTUATOR ARM BEARING PRELOAD ARRANGEMENT FOR A ROTARY DISC DRIVE

[75] Inventors: Roger R. Sleger, Meridian; Edward Walsh, Boise, both of Id.

[73] Assignee: Hewlett-Packard Company, Palo Alto, Calif.

[21] Appl. No.: 829,685

[22] Filed: Feb. 14, 1986

[51] Int. Cl.⁴ .......................... G11B 21/16; G11B 5/55
[52] U.S. Cl. .................................................. 360/106
[58] Field of Search ............................... 360/106, 104

[56] References Cited

FOREIGN PATENT DOCUMENTS 59-94275  5/1984  Japan ................................. 360/106

Primary Examiner—Robert S. Tupper
Attorney, Agent, or Firm—William J. Bethurum

[57] ABSTRACT

A shaft assembly of a rotary actuator arm structure in a rotary disc memory drive in which all machine operations cutting slots or openings for receiving leaf springs which provide axial and radial loads are performed along axes paralleling the axis of the rotary actuator. One leaf spring provides an axial load on the bearings of the shaft assembly. A second leaf spring fitted between one shaft bearing and the bearing housing thereat provides the radial bearing load.

8 Claims, 10 Drawing Figures

ACTUATOR ARM BEARING PRELOAD ARRANGEMENT FOR A ROTARY DISC DRIVE

TECHNICAL FIELD

This invention relates generally to disc drives employing rotary actuator arms and more particularly to arrangements for providing very precise control of the axial and radial stiffness of the bearing asesmblies for such rotary actuator arms.

BACKGROUND ART

Computer disc drives are dynamic magnetic storage units having high bit densities. They are very high precision units requiring close dimensional tolerances in manufacturing and are complex and delicate mechanically. Rotary disc drives generally comprise rotatable memory discs, transducer heads and a pivotally mounted, magnetically driven, actuator arm assembly supporting the transducer heads for bidirectional movement along an arcuate path over the discs.

Conventionally, the pivotally mounted actuator arm carries the flexure assemblies which mount the magnetic heads. The actuator arm is pivotally mounted in an actuator housing by means of a shaft assembly. Very precise control of the axial and radial stiffness and location of this shaft assembly is required for the servo system and the servo system electronics to work properly, and for heads to maintain position with respect to each other and the rest of the structure, particularly the data tracks on the memory discs. The bearings must have a precisely controlled axial and radial preload to do this. Helical compression springs have been used to provide these preloads in prior art structures. One helical spring is used to provide the axial preload on the bearings of the shaft assembly. A second helical spring, disposed radially at one of the bearings in which the shaft is journaled, is used to provide a radial or side load if required, to that bearing. The use of a radially disposed helical spring requires an additional machining operation on the actuator housing in a position off the main axis. The main axis is the axis about which the actuator arm is pivoted. Thus machine operations for installing the radially disposed helical spring cannot easily be performed in the same fixtures used in machining the bores in which the bearings of the shaft assembly for the actuator arm are positioned. This increases manufacturing costs.

DISCLOSURE OF THE INVENTION

This invention provides improvements over prior art arrangements in a structure in which the inner races or rings of the bearings journalling the actuator arm are secured at axially spaced points to the pivot shaft. One of these bearings has its outer bearing structure including a race or ring attached or secured directly in a bore in the actuator housing. The other outer bearing structure includes a sleeve that is fitted with a close clearance in a second bore in the actuator housing. A bowed leaf spring is used to provide a directional or axial bearing preload along the axis of the shaft. Although manufacturing tolerances are closely controlled, clearances will very between the different parts. For the system to function properly, that is, to control stiffness, there must be clearance, providing freedom of movement axially and radially between the bearing assembly and the main structure, at least at one location. This clearance is required to allow for the small dimensional changes due to normal temperature differences in the parts and in their differing thermal expansion rates.

The invention is predicated upon the fact, that in view of the close tolerances, only a very small spring stroke is required axially and radially of the shaft, to maintain the desired spring loads. Thus, a bowed leaf spring or a dished circular spring is used to provide axial bearing preload for the shaft. Likewise for bearing side preload, there is no need for the use of a long spiral spring, with the off axis machining required for its installation and the parts required for its assembly in the actuator housing and the adjustment of its pressure. Simplification with respect to bearing side preload is achieved in the present invention by performing machine operations in the side of the housing bore in which the sleeve for which one of the bearings is fitted, or, in both the housing bore and the sleeve, in a direction paralleling the axis of the housing bore. Thus the machine operations are performed in the same fixture that the boring and other machining operations are performed. The hole or bore radially disposed of the shaft axis in prior art arrangements, is not required.

The slots or cuts in the side of the housing bore, or the sleeve, or, both, may be configured to receive commercially available spring pins which are shaped from flat spring material to have cross sections such as an incomplete circle or a spiral, for example. These are pressed into the cut or slot between the housing bore and the sleeve to bear upon both and thereby to provide the required radial or side loading of the bearing. In general, leaf springs of any appropriate design may be used. Leaf springs having longer spring movement arms than those above are less critical as to tolerances. U-shaped or bowed leaf springs can be designed with longer spring moment arms. One side of such a spring may have a projection, or be otherwise shaped, to provide a line or point contact with the bearing or sleeve. In all cases the springs have an adequate spring rate and are compressed sufficiently to provide the radial force to the sleeve and/or bearing to achieve consistent stiffness, and constant contact under normal bearing reactive forces. The spring force is low enough though that axially generated friction does not overcome the axial preload force along the axis of the shaft to prevent relative movement within design limits.

BEST MODE FOR CARRYING OUT THE INVENTION

Figure 1:
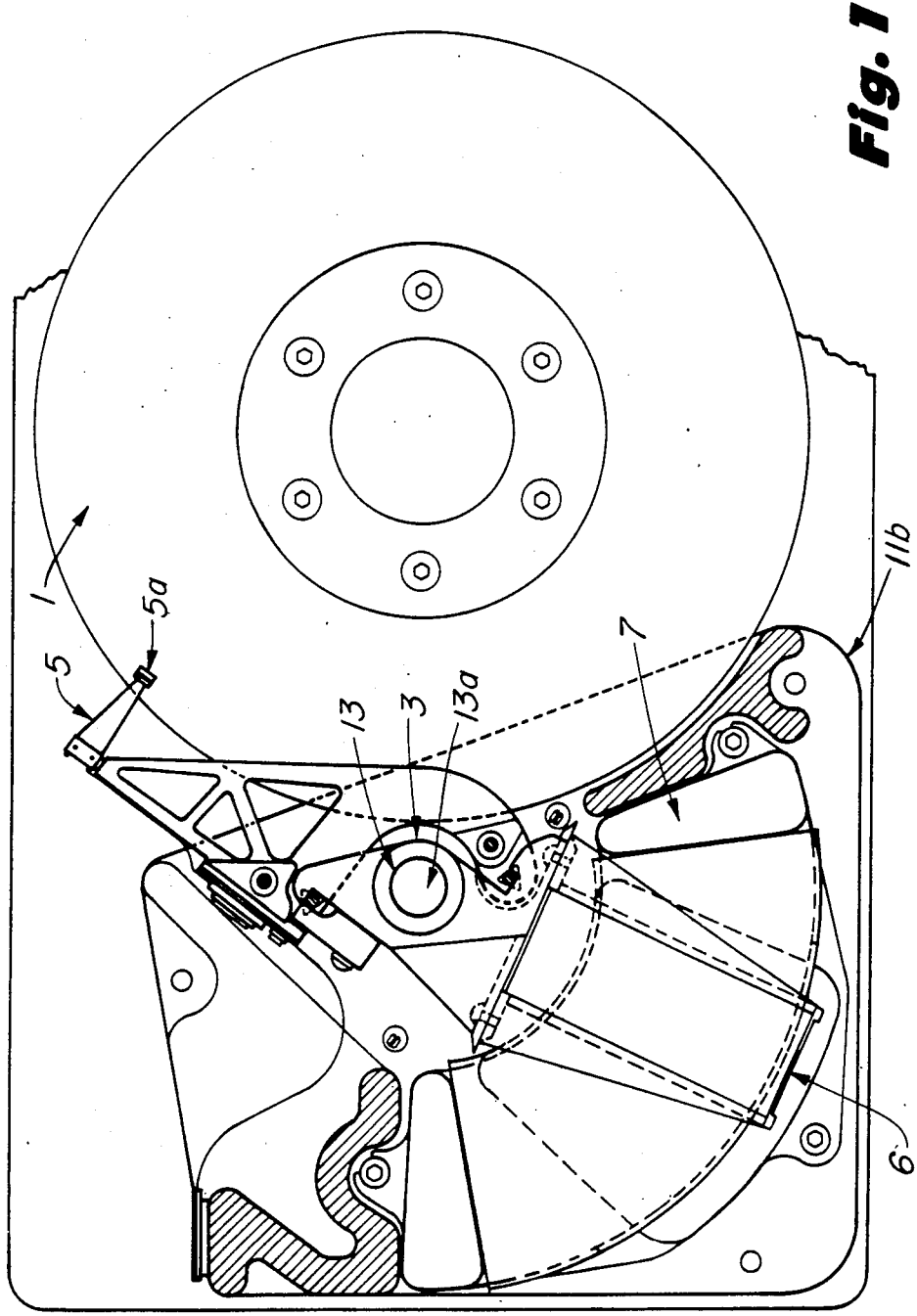
FIG. 1 is a plan view partly in section of a rotary disc memory drive assembly embodying the principles of this invention.
Figure 2:
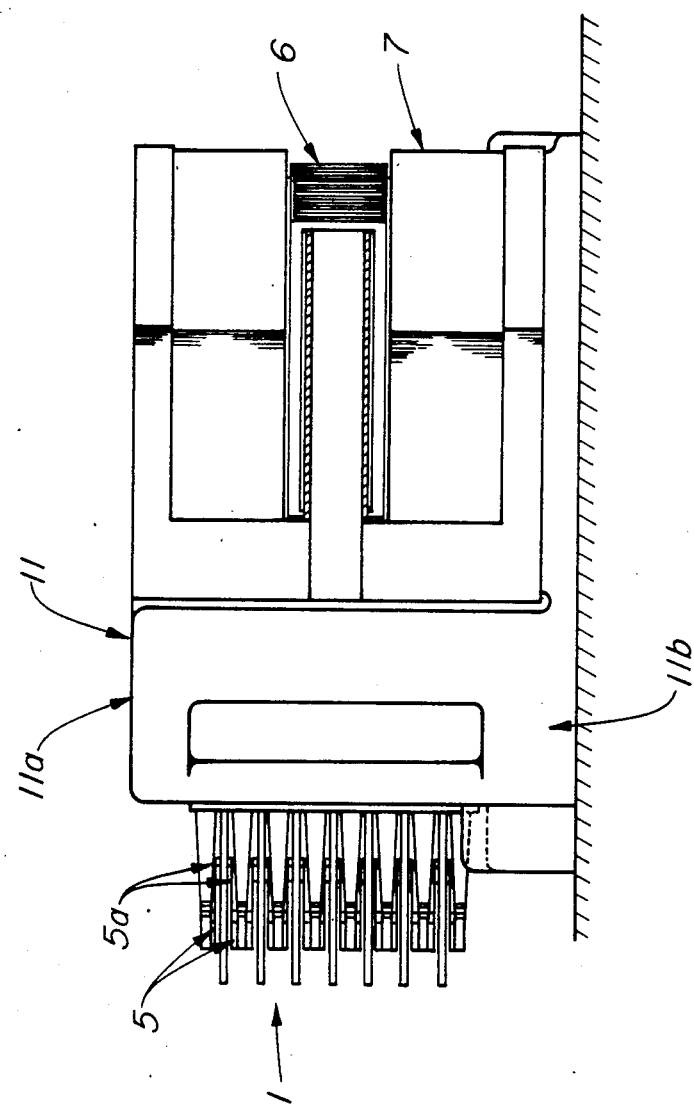
FIG. 2 is a side view partly in section of the disc drive assembly of FIG. 1.

This improved arrangement for providing very precise control of the axial and radial stiffness and position of a bearing assembly is utilized in rotary actuator arm structures of rotary disc memory drives. FIGS. 1 and 2 illustrate a specific rotary disc memory drive in which this invention is utilized. This disc memory drive comprises a disc stack or disc assembly 1, comprising individual memory discs, and a pivotally mounted actuator arm structure 3. Magnetic head assemblies 5 are mounted at one end of the actuator arm structure and a moving coil 6 forming part of a magnetic driver 7 is mounted on the other end of the actuator arm structure. The memory disc stack 1 is typically driven at speeds of about 3600 revolutions per minute by means of a motor not shown. Magnetic heads 5a literally fly above the surfaces of the spinning discs on the thin films of air which cling to the disc surfaces. The spacing of the heads above the disc may be of the order of 19 one millionths of an inch or less. Data track spacing on the memory discs is of the order of 0.0016 inch, or less. It is evident from this that dimensional tolerances are critical.

Figure 3:
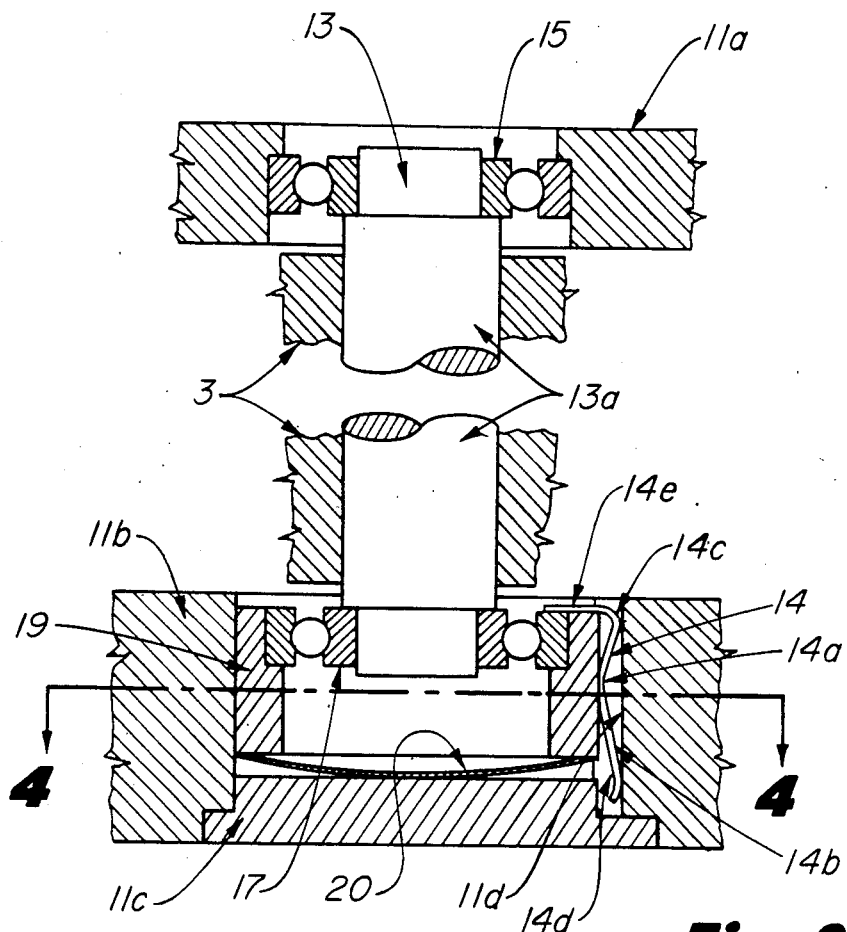
FIG. 3 is an enlarged, longitudinal, fragmentary cross sectional view of a radially and axially preloaded bearing assembly embodying the principles of this invention.

The actuator arm structure 3 is journaled in an actuator housing 11 by means of a shaft assembly 13 having upper and lower bearing structures 15 and 17 fitted in axially aligned circular openings or bores in upper and lower actuator housing sections 11a and 11b (see FIG. 3). Precise control of the radial and axial stiffness of this shaft assembly is required, in maintaining head position with respect to each other and to the rest of the structure, particularly the data tracks on the memory discs, for the servo system electronics to work properly in controlling the magnetic driver 7 for precisely controlling radial positions of the heads 5a at selected radial or data track locations on the individual memory discs.

Figure 4:
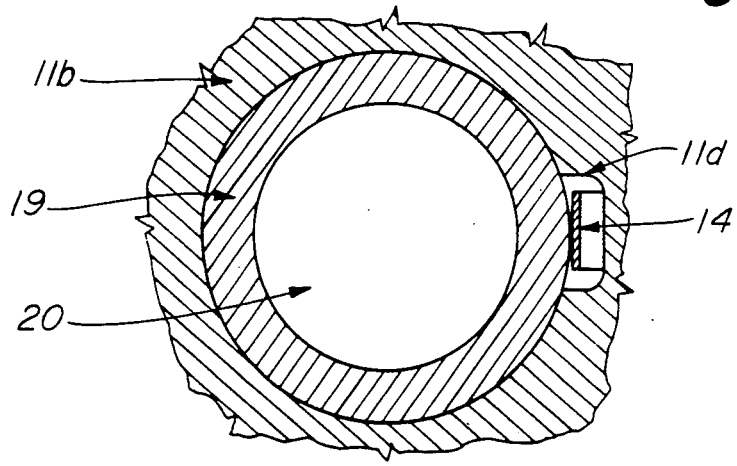
FIG. 4 is a sectional view of the bearing assembly taken on the line IV—IV of FIG. 3.

The unique preloaded, actuator arm pivot structure which accomplishes this, in a presently preferred embodiment of this invention, is illustrated in FIGS. 3 and 4. Here the shaft assembly 13 which journals the actuator arm comprises a shaft 13a to which the actuator arm structure 3 is secured. The ends of this shaft are reduced in diameter and the inner races or rings of respective bearing structures 15 and 17 are pressed or bonded onto these reduced diameter sections and firmly seated against the shoulders. The outer race of the upper bearing structure 15 is pressed or bonded into the opening or bore in the upper actuator housing 11a. The outer race or ring of the bearing 17 is pressed or bonded into an enlarged bore in a circular sleeve 19 forming part of the lower bearing structure. A bearing with a sufficiently thick and wide race might not need a sleeve. The sleeve 19 is slidably fitted to very close tolerances in a bore in the lower actuator housing section 11b. The circumferential edge of a circular bowed spring 20, or each end of a bowed leaf spring of rectangular planform, engages the bottom edge of the sleeve 19 and pressure is applied to the bottom face of this spring by means of an insert 11c which is secured in a complimentary opening in the bottom side of the actuator housing section 11b. This provides the desired axial preload of the bearing structures 15 and 17 to achieve the required degree of axial stiffness.

As noted hereinabove, it has been customary in prior art arrangements to achieve radial stiffness by applying helical spring pressure along an axis radially of a bearing assembly or structure 17 through a side opening in the housing, or in the case where the inner race is free, through a blind cross bored hole in the shaft. This involves machining operations requiring fixtures differing from those utilized in machining openings or bores, such as those receiving the bearing structures 15 and 17, adding significantly to manufacturing costs. Special jigs and fixtures are obviated in this unique structural arrangement for providing radial loads in a degree required to acheive the desired radial stiffness. As seen in FIGS. 3 and 4, a slot 11d is machined in the actuator housing section 11b in a position opening into the bore in which the sleeve 19 is slidably fitted.

Figure 5:
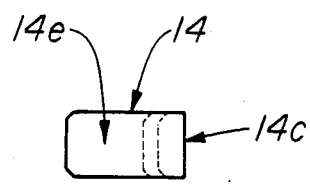
FIGS. 5 and 6 are top and edge projections of the leaf spring of FIGS. 3 and 4.
Figure 6:
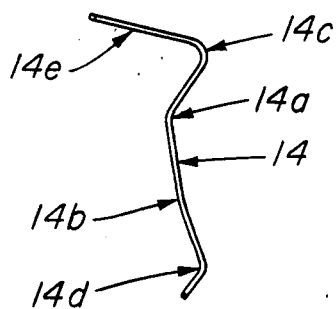

A leaf spring 14 is pressed into this slot. The leaf spring 14 is fabricated from a flat piece of sheet material, as seen from the top and edge projections of FIGS. 5 and 6. The spring is incrementally bent or bowed along its body length to provide a bearing point at bend 14a. A lesser bend is formed at point 14b. Reverse bends 14c and 14d define bearing extremities at the opposite ends of spring 14 on the opposite face of the spring 14 from the bearing face at bend 14a. The bend 14b increases the angle between the spring and the bottom of the slot 11d in the housing, providing a better definition of the bearing line at the bend 14d.

As discussed above, the sleeve 19 has a close tolerance sliding fit within the bore in the actuator housing section 11b. Thus the travel required in providing the required radial or side loading force to the bearing structure 17 which is required is very slight and the spring 14 provides the travel required to eliminate radial play and the force that is needed to acheive the required radial stiffness. The upper end 14e, as viewed, of the spring 14 at the bend 14a when pressed into the slot 11e overlaps and engages the upper end of the sleeve 19, which properly locates the spring in relation to the sleeve 19.

With this arrangement the clearance which is needed to allow for the small dimensional changes due to normal temperature differences in parts and differing thermal expansion rates is provided. At the same time, to control stiffness, and position, contact has been assured within necessasry operating design limits, between the sleeve 19 and the main structure 11b. Axial loading, to provide axial stiffness in the degree required, is achieved by the use of the cupped circular spring 20, or, alternatively, a bowed leaf spring. Radial stiffness is achieved using a leaf spring to side load the lower bearing structure with a side or radial force high enough that the reactive loads due to the normal rotational movement of the actuator arm structure do not unload the bearing structure to cause side play. At the same time, the axial and radial forces are low enough so small relative displacements due to dimensional changes in the operating environment are not restricted by friction force. A thin low friction coating is desirable on the sleeve or bore to assure freedom from sticking.

Figure 7:
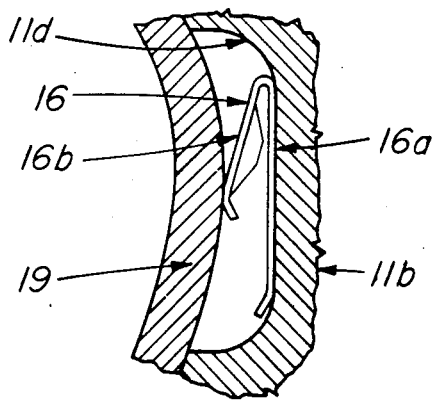
FIG. 7 is a fragmentary view illustrating the installation of a U-shaped spring to provide radial preload of the bearing.

FIG. 7 illustrates a leaf spring 16 of substantially U-shaped configuration. In the spring 16 of FIG. 7, the legs are of different length. The right leg 16a is the longer and its outer face engages the base of the slot 11d. The left leg 16b is the shorter of the two and in its degrees with the right leg. The extremity of the left leg is bent to a position substantially paralleling the right leg when unloaded and occupies a position substantially at the midpoint of the extremeties of the right leg. The width of this spring substantially spans the axial length of the sleeve 19 exposed to the slot 11d.

When installed, as in FIG. 7, the spring 16 is compressed. The right leg 16a lies on the base of the slot 11d and the left leg is deflected toward the right leg, the outer part of the bent or curved end of the left leg 16b bearing against and making substantially a point contact with the sleeve 19 to provide the radial or side load for the bearing structure 17.

The point of contact of the curved end of the left leg 16b of the spring with the lower bearing structure at sleeve 19 with respect to the bend at the upper end of the spring is well defined. Thus the spring moment arm is easily controlled and the spring force for a given deflection in determining bearing side load may be closely controlled.

Figure 8:
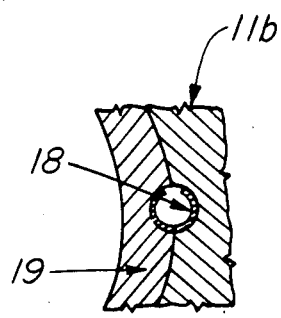
FIGS. 8, 9 and 10 are fragmentary views illustrating respective alternative embodiments of the invention of FIGS. 3 and 4.
Figure 9:
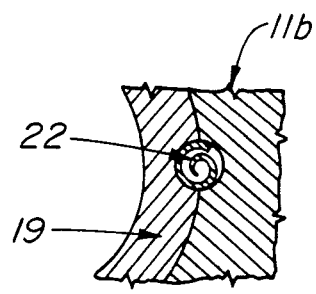
Figure 10:
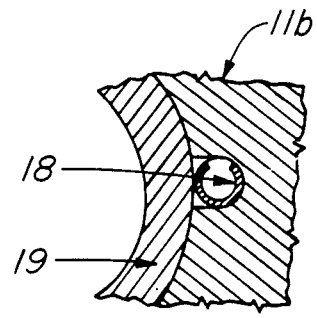

FIGS. 8, 9 and 10 illustrate alternative arrangements for achieving side loads or radial loads on the lower bearing structure 17. These figures, like FIG. 7, are cross sectional views taken only at the juncture between the sleeve 19 and the lower actuator housing, section 11b at which the springs are located.

In FIG. 8, a tubular pin 18 of incomplete circular cross section is pressed into an opening of circular cross section having semicircular portions in the sleeve 19 and in the lower actuator housing section 11b.

In FIG. 9, a pin 22 of spiral cross section is pressed into a similar bore in the sleeve 19 and the lower actuator housing section of 11b.

FIG. 10 shows an alternative arrangement for fitting pins of the type of FIGS. 8 and 9. Here a pin 18 of the type of FIG. 8 is pressed into a slot which is formed entirely in the lower actuator housing section 11b and which opens into the bore in which the sleeve 19 is fitted. In this arrangement line contact with the confronting face of the sleeve 19 is achieved to apply the required radial force in acheiving the desired degree of radial stiffness and position control.

It is obvious that other leaf spring designs embodying these principles will equally satisfy the required design function.

INDUSTRIAL APPLICABILITY

This invention is applied in disc memory drives or files as they are known, which are widely used in computers and digital communication systems for storing information useful in performing arithmetic operations or data processing functions. Close dimensional tolerances in manufacturing must be maintained, yet provision for limited relative movement among critical parts, because of the environment, must be provided, while maintaining relative positions among the transducer heads and, the transducer heads in relation to the data tracks on the memory discs. This invention provides a simplified, cost effective improvement in the pivotal mounting of the rotary actuator, which meets the structural specifications and achieves the performance requirements.

What is claimed is:

1. In a rotary disc memory drive having rotatable memory disc stack and transducer heads for deriving information from the memory discs, means for supporting and moving said transducer heads bidirectionally in arcuate paths over said memory discs, comprising:
   a. an actuator arm assembly mounting said transducer heads;
   b. an actuator housing having upper and lower housing sections;
   c. a shaft assembly pivotally mounting said actuator arm assembly between said upper and lower housing sections, for angular movement sweeping said transducer heads bidirectionally in arcuate paths between inner and outer radial limits over said memory discs;
   d. a bearing mounted adjacent each end of said shaft assembly, each having an outer ring structure, respectively fitted in said upper and lower housing sections
   e. a first leaf spring of a single piece of material, having deflectable sections, compressed between the side of one outer ring structure of one bearing and the adjacent housing section for providing a side preload on said one bearing; and
   f. a second leaf spring having deflectable sections disposed between the end of said one outer ring structure and the adjacent housing section for providing an axial preload on each bearing.

2. The invention according to claim 1, in which:
   a. said deflectable sections of said first leaf spring complete longitudinally displaced bearing sections and an intermediate bearing section, said intermediate bearing section defining a point on a bow between said end sections.

3. The invention according to claim 1, in which:
   a. said first leaf spring has a cross section of an incomplete circle.

4. The invention according to claim 1, in which:
   a. said first leaf spring has a cross section of a spiral.

5. The invention according to claim 1, in which:
   a. said first leaf spring is substantially U-shaped in cross section.

6. The invention according to claim 5, in which:
   a. said U-shaped spring comprises legs of different lengths, the shorter of said two legs having a curved extremity bearing against and making substantially line contact with the side of said one outer ring structure.

7. The invention according to claim 1, in which said one outer ring structure comprises:
   a. an outer bearing ring;
   b. a sleeve securely fitted about said outer bearing ring in said adjacent housing section, said sleeve being longer than the axial length of said outer bearing ring;
   c. said leaf spring having a dimension substantially the same as the axial length of said sleeve exposed to said slot and fitted in stressed spring loaded position between said sleeve and said adjacent housing section.

8. The invention according to claim 1, in which:
   a. said adjacent housing section is the lower housing section.

* * * * *

UNITED STATES PATENT AND TRADEMARK OFFICE
CERTIFICATE OF CORRECTION

PATENT NO. : 4,682,255

DATED : July 21, 1987

INVENTOR(S) : Roger R. Sleger and Edward Walsh

It is certified that error appears in the above-identified patent and that said Letters Patent is hereby corrected as shown below:

Column 1, line 63, delete "very" and insert --vary--;

column 6, line 28, delete "complete" and insert --comprise--;

column 4, line 33, delete "acheive" and insert --achieve--;

column 5, line 36, delete "acheiving" and insert --achieving--;

column 6, line 16, add --;-- after the word "sections".

Signed and Sealed this

Thirty-first Day of May, 1988

Attest:

DONALD J. QUIGG

Attesting Officer

Commissioner of Patents and Trademarks